United States Patent
Heurtel et al.

(10) Patent No.: US 7,004,189 B2
(45) Date of Patent: Feb. 28, 2006

(54) LUBRICATION CUTOFF DEVICE

(75) Inventors: Bertrand Heurtel, Vert Saint-Denis (FR); Guillaume Sevi, Ivry sur Seine (FR); Michel Hugues, Bois le Roi (FR)

(73) Assignee: SNECMA Moteurs, Paris (FR)

( * ) Notice: Subject to any disclaimer, the term of this patent is extended or adjusted under 35 U.S.C. 154(b) by 164 days.

(21) Appl. No.: 10/127,533

(22) Filed: Apr. 23, 2002

(65) Prior Publication Data

US 2002/0157704 A1 Oct. 31, 2002

(30) Foreign Application Priority Data

Apr. 26, 2001 (FR) ................... 01 05600

(51) Int. Cl.
*F16K 17/36* (2006.01)
*F16L 37/38* (2006.01)

(52) U.S. Cl. ...................... 137/71; 251/149.3
(58) Field of Classification Search ............. 137/71; 184/6.4; 251/149.3, 149.6
See application file for complete search history.

(56) References Cited

U.S. PATENT DOCUMENTS

| | | | | |
|---|---|---|---|---|
| 195,049 A | * | 9/1877 | Robinson | 251/149.3 |
| 1,525,775 A | * | 2/1925 | Floyd et al | 137/71 |
| 1,584,625 A | * | 5/1926 | McKay | 137/71 |
| 2,242,401 A | * | 5/1941 | Loughridge | 251/149.6 |
| 2,305,841 A | * | 12/1942 | Carlson | 251/149.6 |
| 2,459,477 A | * | 1/1949 | Schuyver | 251/149.6 |
| 3,508,629 A | * | 4/1970 | Haworth | 184/6.4 |
| 3,771,762 A | * | 11/1973 | Mayernik et al. | 251/149.3 |
| 4,072,162 A | * | 2/1978 | Bellehache et al. | 137/71 |
| 4,413,643 A | * | 11/1983 | Wiklund | 137/71 |
| 4,613,112 A | * | 9/1986 | Phlipot et al. | 137/71 |
| 4,638,975 A | * | 1/1987 | Iuchi et al. | 251/149.6 |
| 4,869,463 A | | 9/1989 | Niittyla et al. | |
| 4,962,831 A | * | 10/1990 | Dundas | 184/6.4 |
| 4,977,927 A | | 12/1990 | Hill | |
| 5,544,858 A | * | 8/1996 | Rogers et al. | 251/149.6 |
| 5,582,204 A | | 12/1996 | Hiranuma et al. | |
| 5,758,866 A | | 6/1998 | Lin | |

* cited by examiner

*Primary Examiner*—John Rivell

(57) ABSTRACT

A connector in a network of lubrication pipes is provided with a valve that automatically closes off the connector whenever one of the pipes is withdrawn following an incident. Lubricant leaks are thus avoided. The valve plug is cylindrical-conical and it is fitted with a needle.

17 Claims, 3 Drawing Sheets

LUBRICATION CUTOFF DEVICE

BACKGROUND OF THE INVENTION (1) Field of the Invention

The purpose of this invention is a lubrication cut-off device.

(2) Description of Related Art

Some machine bearing blocks are lubricated through pipe networks comprising a pump and pipes carrying the lubrication to each bearing block. The ends of the pipes are attached to bearing block supports through collars or similar devices. However, it is possible that the bearing block supports may break or move in another manner, particularly if an out-of-balance mass appears on the shaft supported by the bearing block. The pipes are then torn off from their connectors to the rest of the network and the lubricant spreads in the machine causing various damage, and possibly igniting if it comes into contact with burning regions; furthermore, this lubrication is no longer available for other bearing blocks that may become dry.

The purpose of this invention is a lubrication cut-off device under these circumstances, the effect of which is to cut off the arrival of lubricant at the bearing block for which the supply pipes were torn off from the network.

BRIEF SUMMARY OF THE INVENTION

In its most general form, the invention relates to a lubrication cut-off device comprising a lubricant pipe that may be torn off, a pipe connector into which an end piece of the said pipe is pushed in, a valve housed in the connector and pushed into a seating in which it closes off the connector through the end piece, and possibly a means of pushing the valve plug into contact with the seating. Furthermore, the valve plug comprises a cylindrical body sliding in a housing of the connector, a conical thrust facet in contact with the seating and a thrust needle valve in contact with the end piece, the body being perforated.

The valve plug thus designed is subjected to a sliding movement when it closes, and has a uniform shaped cross section for passage of the lubricant that is invariable with time when it is open, since it is held in place laterally in the pipe. Therefore, the lubricant flows without any variation in the flow or pressure loss. Furthermore, there is a guaranteed and known thrust force applied by the lubricant when the valve plug closes, so that the closing spring can confidently be eliminated.

The following describes specific embodiments of the invention.

BRIEF DESCRIPTION OF THE DRAWINGS

The following figures should be read in conjunction with this text.

DETAILED DESCRIPTION OF THE INVENTION

Figure 1:
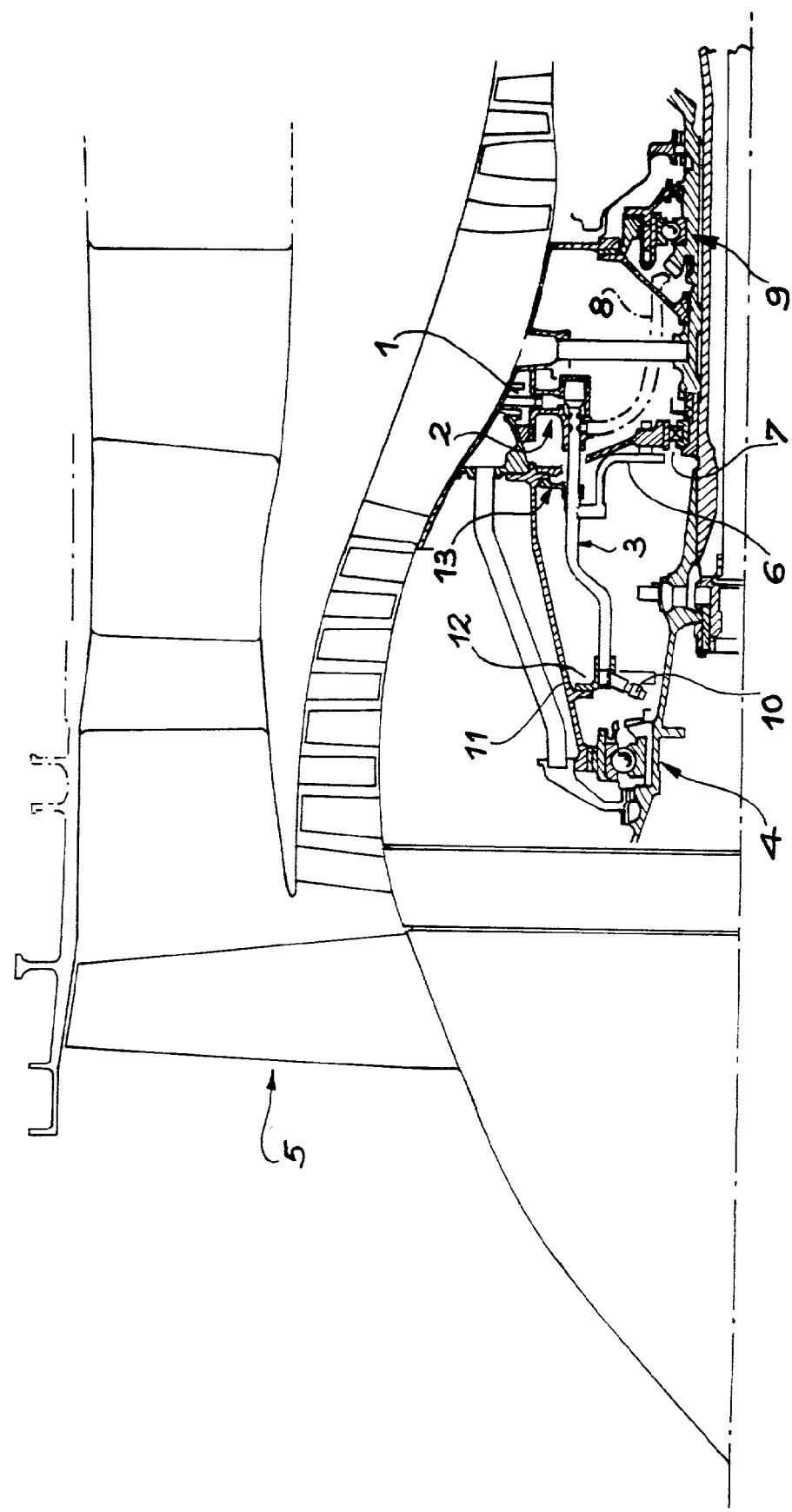
FIG. 1 is a partial view of a lubrication device equipped with an embodiment according to the invention.
Figure 2:
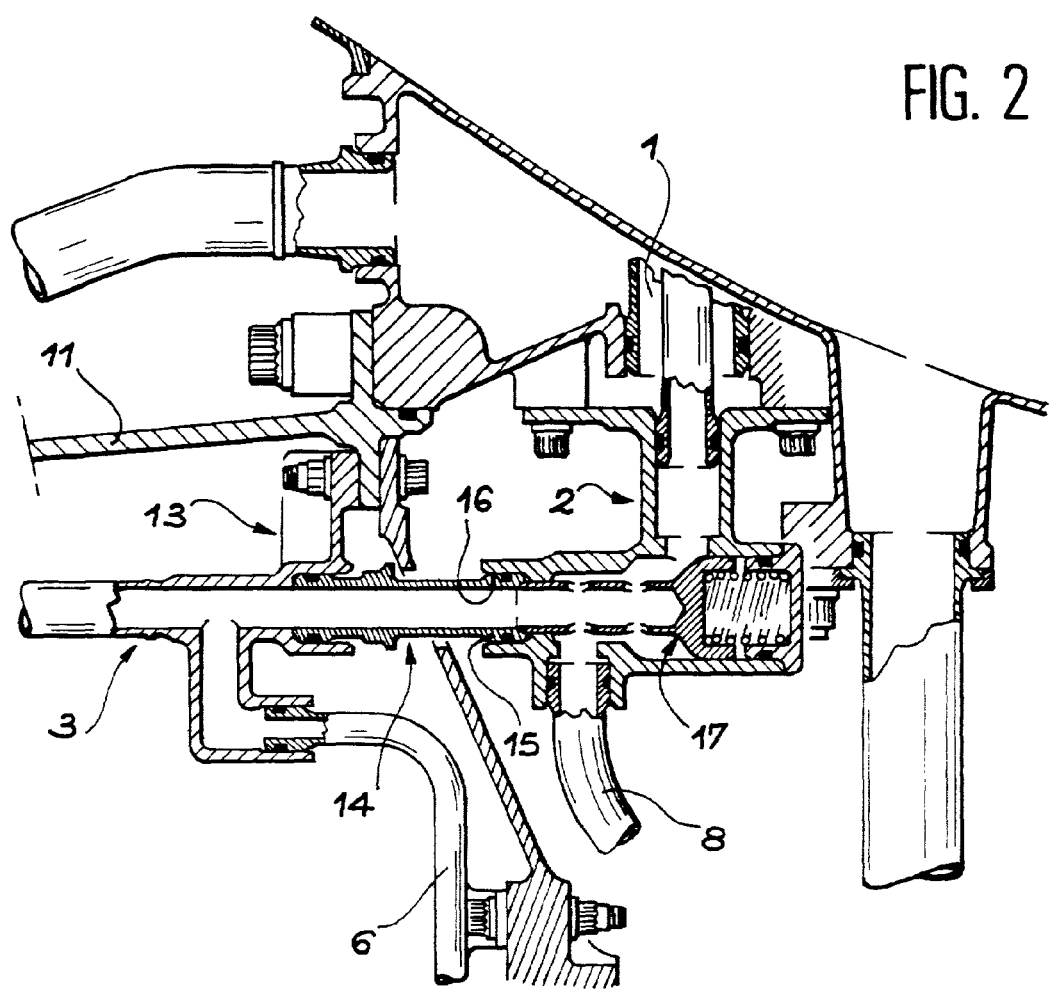
FIG. 2 is an enlargement of FIG. 1.

The lubrication network in FIGS. 1 and 2 includes particularly a general supply pipe 1 that ends at a connector 2 that connects it to a lubrication pipe 3, that transfers lubricant to a front bearing block 4 in a shaft line, close to a gas turbine blower 5, and that also includes a fork 6 towards a second bearing block 7 slightly behind the first bearing block; in this case, the connector 2 also comprises a second lubrication pipe 8 leading to a third bearing block 9 even further behind the others. In general, the lubrication pipes are fitted with a sprayer nozzle 10 at their end facing the bearing block, and close to this position they are connected to a structure 11 of the support bearing block through a collar, an attachment tab 12 or any other means. In this case, the pipe 3 is still connected through its opposite end close to connector 2, to the structure 11 through another attachment tab 13, and in fact a connection tube 14 to the pipe 3 actually supports an end piece 15 pressed into a drilling 16 in the connector 2 so that the oil from pipe 1 passing through connector 2 then passes into the tube 14 and then the pipe 3. This double support layout of the lubrication pipe 3 and the separate connection tube 14 does not in any way change the existing problems; the tube 3 can be entrained if the support 11 is deformed, and the continuity of the lubrication network disappears as soon as the pipe 3 is torn off from tube 14, or if it is torn off from the connector 2.

Figure 3:
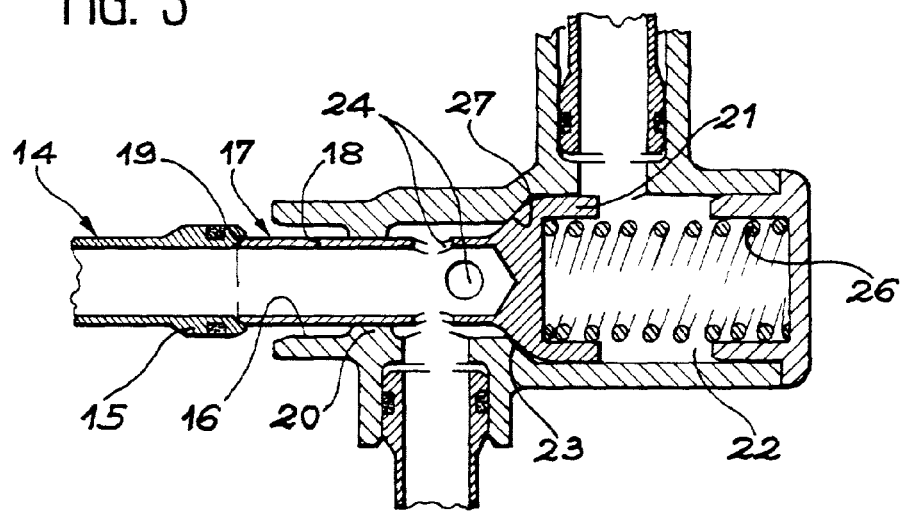
FIG. 3 is a view of the cut-off device in the state in which the pipe is torn off from the connector.

A valve plug 17 forming part of the invention becomes useful in this rupture situation. As shown in FIG. 3, it comprises a cylindrical body 18 at the front, with a front face 19 touching the end piece 15, and which slides in a support ring 20 at the bottom of the drilling 16; a cylindrical base 21 near the back and that slides in a cylindrical housing 22 in connector 2; and a conical face 23 that connects the body 18 to the base 21. Furthermore, the body 17 is hollowed out over its entire length, opening up towards the front of tube 14 and sideways through drillings 24; and the base 21 is fitted with a compression spring 26 behind a reception housing 22, the spring extending as far as the bottom of the housing 22.

Under normal conditions, oil coming out of pipe 1 enters the third lubrication pipe 8, going around the cylindrical body 18 and the pipe 3, through the tube 14, passing through the orifices 24 and the recess in the body 18. However, if the pipe 3 is moved, the spring 26 coaxial with the valve plug 17 and the tube 14 is then free to expand and to push the tube, forcing the end piece 15 out of the drilling 16 if the tube 14 remained in place. The conical face 23 then is forced into contact with seating 27 with a shape corresponding to the housing 22, and this contact causes a seal, the housing 22 then being closed by the valve plug 17. Bearing blocks 4, 7 and 9 are then no longer supplied through the network, but sufficient static lubrication remains until the shaft is stopped.

Figure 4:
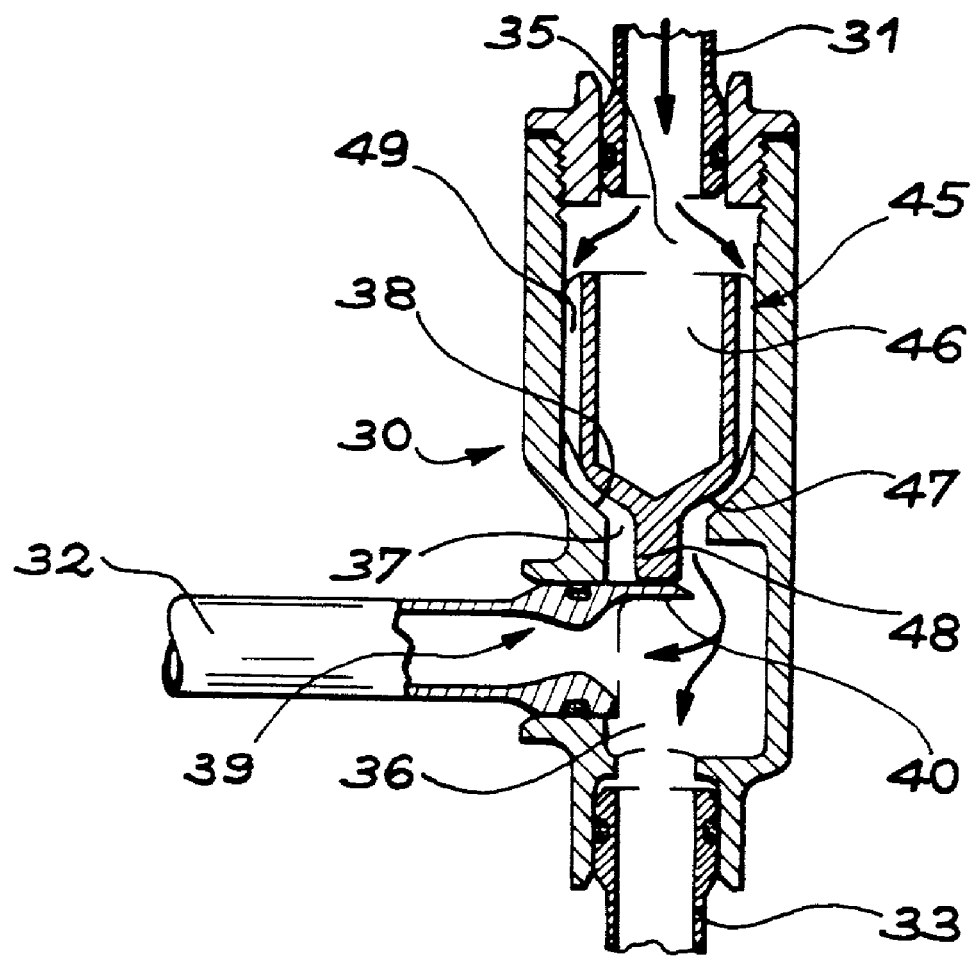
FIG. 4 illustrates another embodiment of this system.

The embodiment shown in FIG. 4 has some elements that are already in the previous figures.

A connector 30 is placed between a supply pipe 31 and two lubrication pipes 32 and 33, the first of which can be torn off. The connector contains a cylindrical housing 35 of the valve plug 45. The housing 35 connects the supply pipe 31 to an orifice 37 that opens up into another housing 36 at the connection of the lubrication pipes 32 and 33. The orifice 37 is surrounded by a conical seating 38 opening up into the housing 35. The pipe 32 comprises an end piece 39, the end of which supports a lip 40 projecting into the other housing 36 and in front of orifice 37; the lip 40 extends around part of the periphery turn in order to avoid excessively restricting the lubricant flow. The shape of the valve plug 45 is complex and similar to that shown in FIGS. 1 and 2, since it comprises a cylindrical body 46 (at the back in this case), a conical face 47 (in front of the body 46) and a needle valve 48 extending the conical face 47 forwards and that touches the distribution pipe 32 and more precisely its lip 40.

The needle valve 48 passes through the communication orifice 37 of the housings 35 and 36, and the body 46 also has recesses, in this case axial grooves 49 at its periphery. Oil forced out of the supply pipe 31 into the housing 35 passes through the connector 30, passing through the grooves 49 and passing in front of the conical face 47 and the needle valve 48 before entering the housing 36 and being distributed into pipes 32 and 33. If pipe 32 is torn off, the lip 40 disappears and the oil pressure pushes the valve plug 45 until the conical face 47 touches the seating 38 and interrupts the communication through the connector 30.

The section of the grooves 49 and the orifices 24 precisely determines the characteristics (flow and head loss) of the lubricant flow through the valve plug 17 or 45 in the open state. Closing is fast and regular. No spring is necessary in this case, in which the valve is coaxial with the flow.

The valve plug may have any arbitrary displacement direction with respect to the penetration direction of the lubrication pipe with which it cooperates in the pipe connector; in particular, the directions may be identical or may intersect.

The invention claimed is:

1. Lubrication cut-off device comprising:
   a lubricant pipe that may be torn off;
   a pipe connector in which an end piece of said pipe is forced;
   a valve plug housed in the pipe connector and pushed from a seating at which said valve plug closes off the pipe connector by the end piece, wherein the valve plug comprises a cylindrical body that slides in a housing of the pipe connector, a conical thrust facet between the seating and a thrust needle valve in contact with the end piece, the body being perforated and drilled with axial grooves around the periphery, wherein the end piece is fitted with a lip that projects in an axial direction and extends around a part of the periphery of the end piece opposite the valve plug.

2. Lubrication cut-off device according to claim 1, wherein said device is designed to push the valve plug back into place with lubricant pressure alone.

3. Lubrication cut-off device according to claim 1, wherein the end piece is pushed into the pipe connector along a line perpendicular with a path followed by the valve plug.

4. Lubrication cut-off device comprising:
   a lubricant pipe that may be torn off;
   a pipe connector in which an end piece of said pipe is forced;
   a valve plug housed in the pipe connector and pushed from a seating at which said valve plug closes off the pipe connector by the end piece, wherein the valve plug comprises a cylindrical body that slides in a housing of the pipe connector, a conical thrust facet between the seating and a thrust needle valve in contact with the end piece, the body being perforated, wherein the end piece is pushed into the pipe connector along a line intersecting a path followed by the valve plug, and the end piece is fitted with a lip that projects in an axial direction and extends around a part of the periphery of the end piece opposite the valve plug.

5. Lubrication cut-off device according to claim 4, wherein said device is designed to push the valve plug back into place with lubricant pressure alone.

6. Lubrication cut-off device comprising:
   a pipe;
   a connector in which an end piece of said pipe is engaged;
   a valve plug in the connector, wherein the valve plug comprises a body that slides in a housing of the connector, the body defining grooves on a body periphery, wherein the end piece is fitted with a lip that projects in an axial direction and extends around a part of the periphery of the end piece opposite the valve plug.

7. Lubrication cut-off device according to claim 6, wherein said pipe is configured to be torn off.

8. Lubrication cut-off device according to claim 6, wherein said valve plug is pushed from a seating at which said valve plug closes off the connector by the end piece.

9. Lubrication cut-off device according to claim 6, wherein said body is cylindrical.

10. Lubrication cut-off device according to claim 8, wherein said valve plug comprises a conical thrust facet between the seating and a thrust needle valve in contact with the end piece.

11. Lubrication cut-off device according to claim 6, wherein said body is perforated.

12. Lubrication cut-off device according to claim 6, wherein said grooves are axial.

13. Lubrication cut-off device according to claim 12, wherein said grooves extend around said body periphery.

14. Lubrication cut-off device comprising:
   a pipe;
   a connector in which an end piece of said pipe is engaged;
   a valve plug housed in the pipe connector, wherein the valve plug comprises a body that slides in a housing of the pipe connector, a thrust facet between a seating for said valve plug and a thrust needle valve in contact with the end piece, the body being perforated, and
   wherein the end piece is pushed into the connector along a line intersecting a path followed by the valve plug, wherein the end piece is fitted with a lip that projects in an axial direction and extends around a part of the periphery of the end piece opposite the valve plug.

15. Lubrication cut-off device according to claim 14, wherein said pipe is configured to be torn off.

16. Lubrication cut-off device according to claim 14, wherein said valve plug is pushed from said seating at which said valve plug closes off the connector by the end piece.

17. Lubrication cut-off device according to claim 14, wherein said body is cylindrical.

* * * * *